Feb. 17, 1970 W. A. BAILEY ET AL 3,495,410
CORRUGATED HALF TILE AND METHOD OF MAKING SAME
Filed Nov. 14, 1966 2 Sheets-Sheet 1

INVENTORS
Walter A. Bailey
Donald L. Magee
Roger P. Bailey
BY
ATTORNEYS

Feb. 17, 1970 W. A. BAILEY ET AL 3,495,410
CORRUGATED HALF TILE AND METHOD OF MAKING SAME
Filed Nov. 14, 1966 2 Sheets-Sheet 2
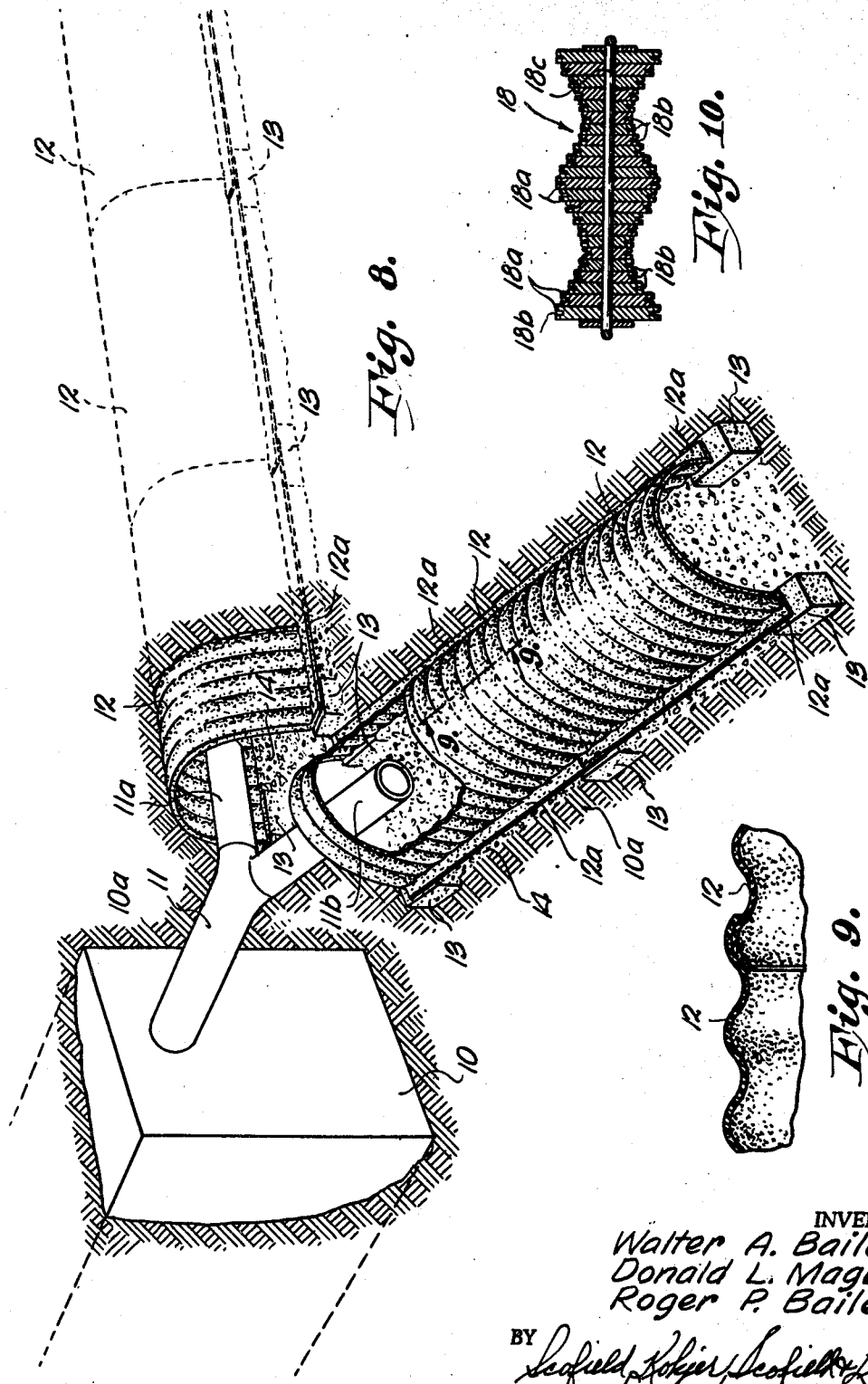
INVENTORS
Walter A. Bailey
Donald L. Magee
Roger P. Bailey
BY
ATTORNEYS

1

3,495,410
CORRUGATED HALF TILE AND METHOD
OF MAKING SAME
Walter A. Bailey, 3440 N. 66th St., Lincoln, Nebr.
68507; and Donald L. Magee, Rte. 8; and Roger P.
Bailey, 4131 Clifford Drive, both of Lincoln, Nebr.
68506
Filed Nov. 14, 1966, Ser. No. 594,163
Int. Cl. E03f 3/04; E02b 11/00; F16l 9/06
U.S. Cl. 61—11                          1 Claim

ABSTRACT OF THE DISCLOSURE

A septic tank leach field uses an elongate open bottom drainage duct to disperse fluids from the tank to outlying disposal areas. The duct is comprised of a tile-like structure (or a plurality of tile-like structures) that is shaped like a cylinder that has been halved along its diameter. The wall of the tile is constructed of a corrugated glass fiber reinforced synthetic resin. The method of manufacturing this corrugated fiber reinforced structure having a curvature therein includes the steps of applying a liquid form release to a curved corrugated form, combining and applying a material composed at least in part of a resin and cut glass fiber to said form and allowing said form material to build to a preselected depth thereon, compacting said material to a preselected depth on said form, curing said compacted material and removing said cured compacted material from said form, said cured compacted material thereby resulting in said corrugated structure.

---

The invention will be described in terms of a corrugated half tile designed for use with septic tanks. In rural, recreational and in a great many suburban areas, septic tank leach fields are used to transmit and disperse fluids from a septic tank to the outlying disposal area. These leach fields contain laterals or effluent-receiving chambers which connect with the discharge point of the septic tank and accordingly disperse the fluid. Many states have regulations both as to the length and size of the laterals. A typical example of a state regulation requires that the laterals must be at least 100 feet in length, comprising either a single 100 foot long section or two 50 foot sections diverging from the septic tank.

In constructing heretofore conventional leach fields, a trench or ditch is dug, about three feet wide and four feet deep, and eight inch blocks are set in the trench for the purpose of supporting quite heavy concrete or Hydite tiles. These half tiles are usually manufactured in four foot long sections and are semi-circular in cross section. Several of the half tiles are then placed on the supporting blocks and connected in such a manner that the blocks and tiles run from the septic tank the required 50 or 100 feet. Loose gravel is placed into the trench and allowed to fill around the sides of the half tile. The gravel will edge under the lower edges of the supported tile and partially fill the open end, until gravel occupies an area approximately four inches above the upper surface of the interconnected tiles. The soil is then replaced on the gravel, thusly allowing the effluent to seep into the surrounding subsoil from the half tile through the gravel and appropriately dispersing same.

An object of the invention is to provide corrugated fiber reinforced half tiles and related articles of manufacture that are light weight, corrosion resistant, moisture impermeable, and extremely tough and durable.

Another and highly important object of the invention is to provide a method for manufacturing half tiles, and other similar related curved surfaced articles of the character described, which include the steps of applying a form release wax to an appropriate form, spraying a fiber reinforced resin material on said form to a preselected depth or thickness, compacting the material to the desired final thickness, drying or curing the compacted material, and removing said compacted and cured material from said form.

Another object of the invention is to provide half tiles of the character described that are easily stored, hauled and installed. This is a highly important feature of the invention in that the half tiles made by the unique method described above have the advantage of being both light weight and relatively thin-walled thusly facilitating stacking, storing and transporting same. For example, heretofore it was possible only to place six to eight such concrete or Hydite half tiles in a half ton truck. The present unique structure and design allows literally hundreds of the light weight, easily stacked tiles to be placed on the same sized truck. This, of course, significantly reduces trucking and hauling costs.

Equally as significant is the elimintion of heavy, expensive and hard to use installation equipment. The subject design no longer requires the use of such equipment as A-frame supported block and tackle arrangements to lower and position the tile in the trench. This has increased public safety and significantly reduced injuries accompanying the use of such equipment.

A still further object of the invention is to provide a fiber reinforced resin half tile of the character described that reduces installation labor costs and provides a simple means for connecting the half tile lengths by overlapping or intermeshing the corrugation ridges and valleys at each end portion. This structure eliminates the prior art tar paper connection which was both time consuming and an additional cost. Accordingly, the light weight corrugated fiber reinforced half tile requires fewer men during installation, lessens the need for and consumption of coupling material and significantly reduces the labor-cost per installation job.

Another object of the invention is to provide a fiber reinforced resin half tile of the character described that is acid resistant, capable of withstanding dynamic loads equal to and greater than concrete half tiles, and has a long serviceable life time. An important feature of the half tile structure resides in the semi-circular shape of the half tile in conjunction with the corrugations. The combined features result in an extremely tough and durable structure with a high resistance to fracture.

Another object of the invention is to provide an anti-corrosion structure which significantly aids in the elimination of sewage disposal products from underground streams and waters.

A still further object of the invention is to provide an improved effluent septic tank water draining means that promotes general public health and aids in the elimination of water pollution. Due to the above-mentioned characteristics of the half tile, the lightness of weight and ease of installation, storing and hauling, these half tiles are considerably more available to the public. Prior to our invention, only a few retail outlets located in rural areas could afford the storage and labor costs inherent in maintaining a stock of concrete or Hydite half tiles (or circular tiles). Now, related retail stores, both large and small, throughout many of the heretofore unserviced rural areas can afford to have on hand pollution preventing water draining means of the character described.

Other and further objects of the invention together with the features of novelty appurtenant thereto will appear in the course of the following description.

In the accompanying drawings, which form a part of the specification and are to be read in conjunction therewith and in which like reference numerals indicate like parts in the various views;

FIG. 8 is a perspective view of the several corrugated half tiles interconnected and in use with a septic tank;

FIG. 9 is a sectional view taken along the line 9—9 of FIG. 8 in the direction of the arrows, same showing the interlocking connecting feature of the corrugated half tile; and FIG. 10 is a sectional view taken along the line 10—10 of FIG. 6 in the direction of the arrows and showing the construction of the compacting roller used with the corrugated forms.

Figures 1, 2:
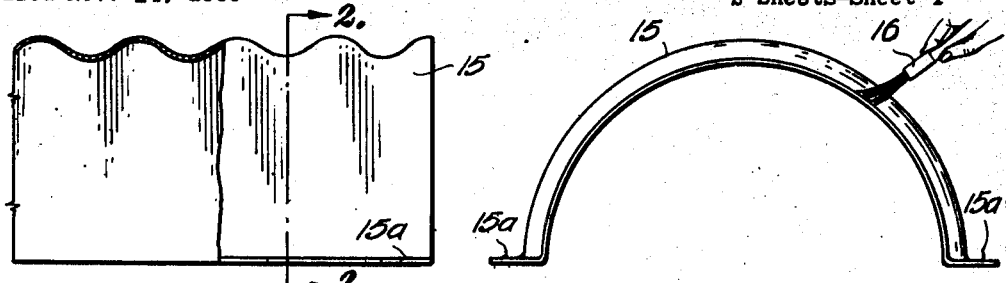
FIG. 1 is a side view of the form used to construct the corrugated half tile with the right-hand portion of the view shown in elevation and the left-hand portion shown in section.
FIG. 2 is a sectional view taken along the line 2—2 of FIG. 1 in the direction of the arrows, and showing the application of a liquid wax form release to the exterior of same.

In the broad sense, our invention relates to the construction of fiber reinforced resin and corrugated structures which are extremely tough, durable, acid and corrosion resistant, moisture impermeable, light weight and capable of withstanding quite large dynamic loads.

The structure referred to in the following discussion and shown in the various views is one of a variety of possible shapes and is commonly referred to as a half tile. The name "half tile" is derived because the over-all shape of the structure would resemble a corrugated cylinder that had been halved along its diameter, each half thereby forming a half tile. For convenience of storage, hauling and installation, the abovementioned half tiles are manufactured in approximately four (4) foot lengths and are interconnectible during installation by overlapping the end portions as shown in FIGS. 8 and 9.

Use of half tiles with a septic tank is shown in FIG. 8, wherein reference numeral 10 represents a conventional septic tank (shown buried in ground or soil 10a) having an outlet pipe 11 that branches into a Y and includes the short outlet sections 11a and 11b. As mentioned above, the four (4) foot half tile sections, hereinafter identified by the numeral 12, are set in trenches on eight (8) inch blocks 13 and a gravel 14 (of the buckshot or pumice variety) is filled therearound. The interconnected half tiles 12 form the laterals of the leach filed in that the trenches are appropriately sloped to facilitate optimum drainage. As the effluent rises in the septic tank 10 and exits through outlet pipe 11 and sections 11a and 11b, the fluid is discharged into each lateral and is distributed along the length thereof through the gravel and into the porous capillary structure of the soil. It should be noted that for sanitary and health reasons, it is desirable that the effluent is allowed to permeate the length of each lateral and not to flood only a small portion thereof. Thusly, one of the requirements of the half tile must necessarily be to resist corrosion and deterioration from the acid content of the effluent over a period of years. Additionally, the considerable weight of the gravel and subsoil on the half tile must not produce such a dynamic load as to result in a fracture that would allow a surge of effluent to exit prematurely through a portion of the half tile rather than travelling the length of the lateral as intended.

The illustrative four foot sections of half tile may have various radii and the wall thicknesses may likewise vary. The particular embodiment disclosed herein may have, for example, a corrugation depth of approxiamtely ⅞ inch with the peak ridges sinuously continuous every two inches. As seen by the various end and sectional views, the shape of the half tile is semi-circular with a mounting lip 12a running the length of the edges of the wall along the open bottom. This mounting lip, with a half tile having a radius of approximately 8⅞ inches, will present an approximately 1½ inch mounting surface against the blocks 13 that have been appropriately spaced along the length of the trench. The corrugated structure in conjunction with the glass fiber resin material gives our structure increased strength and durability while simultaneously allowing the weight per structure to be significantly reduced. Tests have shown that half tiles of our design that are approximately ⅛ inch thick are capable of withstanding loads equal to and greater than similarly sized concrete half tiles which are 2¾ inches thick.

It is contemplated that the glass fiber tiles may take on shapes other than semi-circular such as being elliptical or completely round, with the length sinuously corrugated in the manner described. Such shapes will be determined solely by the use intended for the finished product.

Referring now to FIGS. 1–7, we have shown a typical assembly line process for carrying out the method of the invention. It should be noted that this process could be easily automated. Reference numeral 15 represents the typical forms that are used in producing the half tiles of the character described. The forms are selected for and designed according to the dimensions desired of the finished product. For example, the form 15 has an extending lip 15a positioned relative to the lower longitudinal edges for the purpose of forming the above-mentioned mounting lip 12a. Additionally, the corrugation depth and the frequency of corrugation ridges of the finished structure are determined by the form.

FIG. 2 shows a form release material, in this case a liquid wax, being brushed onto form 15 by brush 16. Alternatively, the liquid wax may be sprayed on in a number of ways including tht use of an aerosol spray. We have further found that for best results in manufacturing half tiles, the forms should be horizontally oriented rather than vertical.

Immediately after the liquid wax form release has been applied over the entire surface of a horizontally oriented form, the fiber reinforced resin may be applied thereto. No waiting or drying time is required for the liquid wax form release. We have found that a spray system, known as the "Spray Up" system, schematically represented by nozzle 17 and manufactured by Glas-Craft Company of Glendale, California, operates in a satisfactory manner for our intended process. In this system the resin and the catalyst are thoroughly mixed in a special mixing chamber inside the nozzle or gun head. A catalyst injector system supplies liquid peroxide for the catalyst delivery. When the gun or nozzle trigger is depressed, a proper percentage of catalyst is vaporized and brought through an atomizing air line in the gun. The resin is also atomized in the chamber and simultaneously mixed with the catalyst. When the trigger is completely depressed, chopped glass fiber is simultaneously sprayed with the catalyzed resin in regulated amounts. The entire operation can be easily accomplished by one man or with automated equipment.

Figures 3, 4:
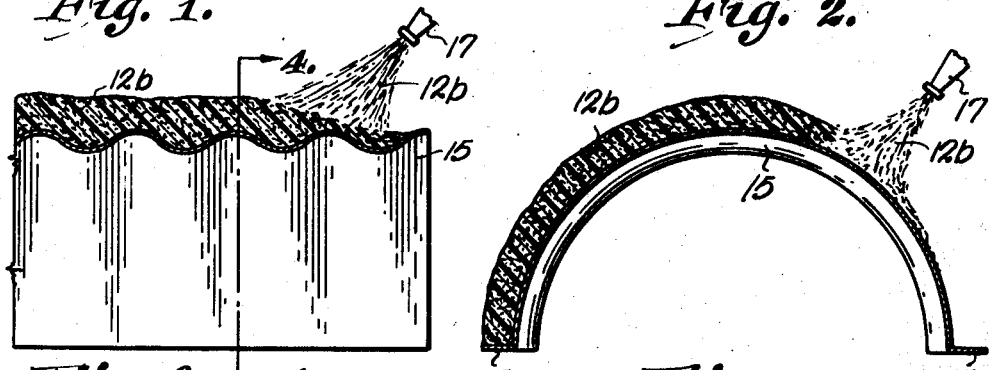
FIG. 3 is a partial sectional side view of the form showing the combination glass fiber resin material being sprayed thereon after the liquid wax form release has been applied thereto and prior to the step of compacting the material.
FIG. 4 is a sectional view taken generally along the line 4—4 of FIG. 3 in the direction of the arrows.

The catalyzed fiber reinforced resin, indicated by the numeral 12b, piles up on form 15 when applied thereto in a manner shown in FIG. 3. FIG. 4, an end view of form 15, shows the fiber reinforced resin as it has piled up on at least half of the frame, including the lip portion 15a. It has been found that the bulky uncompacted piled fiber reinforced resin is necessarily applied or sprayed on to build up an amount having a greater thickness than the final intended thickness because of the interstitial air accumulation. There is, of course, a direct relationship between the amount of fiber reinforced resin sprayed on the form and the ultimate thickness. In the preferred embodiment, the fiber reinforced resin is applied in a uniform manner over the entire upper surface of the form to an approximate 2 inch depth above the outermost radius of the form. This depth will ultimately result in a finished half tile having a ⅛ inch final wall thickness.

Figures 5, 6:
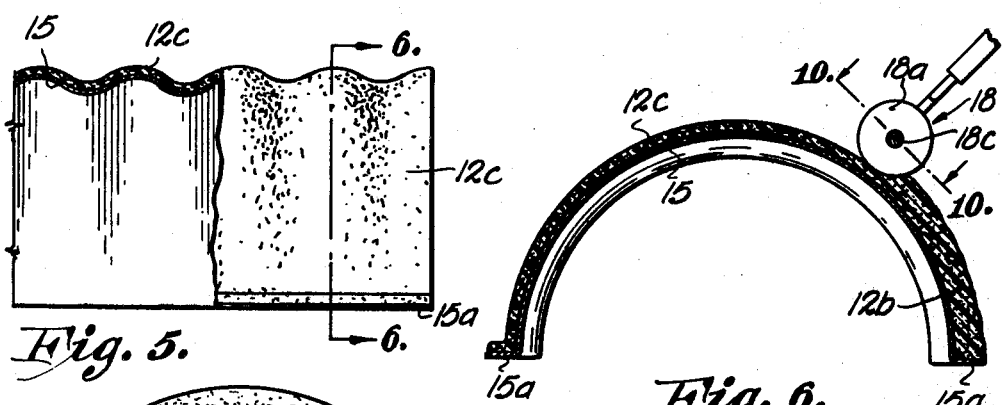
FIG. 5 is a side view of the form and compacted material comprising the glass fiber and resin thereon, the right-hand portion being an elevational view and the left-hand portion being in section.
FIG. 6 is a sectional view taken generally along the line 6—6 of FIG. 5 in the direction of the arrows and showing the rolling compacting step during the method of manufacturing the corrugated half tile.

FIG. 6 shows the bulk fiber reinforced resin being compacted by roller 18. FIG. 10 shows a sectional view of roller 18, and indicates therein that the roller is contoured to intermesh with the corrugation ridges and valleys of the form 15. For best results the roller is all metal and constructed of a plurality of appropirately sized disks 18a. Each disk has a centered groove 18b circumscribed therein. These disks are mounted on rod 18c which may be bent in the form of the operating handle and are accordingly relatively movable therewith.

Roller 18 is moved along the outer surface of the bulk resin 18 under pressure and compacts the material to the desired thickness. The roller construction, e.g. the plurality of disks allows each disk to move independently and the grooved periphery helps in eliminating air pockets. The compacting of the bulk fiber reinforced resin is done immediately after same has been sprayed onto the form in order to compact the material prior to its curing or setting. The now compacted fiber reinforced resin, represented by the numeral 12c, is allowed a curing or drying time of approximately 10 minutes before the excess material (over-spray) is trimmed. This essentially means that if an excess of the bulk resin 18 has been applied thereto, trimming will eliminate the overspray, resulting in a finished product of the desired shape and form.

Figure 7:
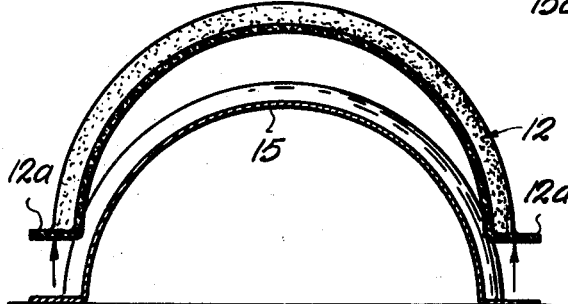
FIG. 7 is an end view of the form and half tile, showing therein the completed half tile being removed from the form.

After the compacted and trimmed fiber reinforced resin has dried or cured for approximately ten minutes, the finished product, the half tile 12, is removed from the form 15 as shown in FIG. 7. The liquid wax form release allows the compacted and cured completed half tile to be easily removed from the form by merely lifting along lip 12b with a putty knife or similar apparatus. The finished half tile is then ready for immediate utilization.

Because of the material used, the method of manufacture, and the structural shape dimensions of the finished product, the half tile may be more conveniently stored, hauled and assembled, than what had heretofore been possible. For example, the four foot half tile sections, of the character described, may be easily stacked in a telescoped manner and shipped in bundles.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forh or shown in the accompanying drawings is to be interpreted as illustrative and not in a limiting sense.

Having thus described our invention, we claim:

1. In a septic tank leach field having a tank containing fluid, said tank having an outlet for said fluid, the improvement comprising
   a drainage duct in communicating relationship with said outlet, said duct having a structure that is symmetrical with respect to the longitudinal center line with an open bottom along the length thereof,
   the wall of said duct constructed of fiber-reinforced resin and formed with parallel sinuously continuous corrugations running at right angles to said center line, and
   a flat mounting lip integrally formed with edges of the wall along the open bottom, said lip supporting said duct in its operative environment, said duct being operable to assist in the transmitting and dispersement of said fluids to an outlying disposal area.

References Cited

UNITED STATES PATENTS

| | | | |
|---|---|---|---|
| 980,442 | 1/1911 | Schlafly | 61—10 |
| 1,049,543 | 1/1913 | Smith | 61—16 X |
| 2,703,109 | 3/1955 | Saville | 138—55 |
| 2,873,226 | 2/1959 | Davies et al. | 154—83 |
| 3,156,099 | 11/1964 | Dailey | 61—12 X |
| 2,782,604 | 2/1957 | Mixon | 61—11 |
| 3,369,367 | 2/1968 | Saad et al. | 61—11 |

FOREIGN PATENTS 1,360,864  4/1964  France.

JACOB SHAPIRO, Primary Examiner

U.S. Cl. X.R.

61—13, 16; 264—331